(12) United States Patent
Gullicksen

(10) Patent No.: US 6,546,004 B2
(45) Date of Patent: Apr. 8, 2003

(54) METHOD AND APPARATUS FOR DISTRIBUTING ACCESS DEVICES FOR VOICE/DATA COMMUNICATION IN A COMMUNICATION SYSTEM OVER PACKET BASED NETWORKS

(75) Inventor: Jeff Gullicksen, Santa Clara, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/223,841

(22) Filed: Dec. 31, 1998

(65) Prior Publication Data

US 2002/0122425 A1 Sep. 5, 2002

(51) Int. Cl.⁷ .............................................. H04L 12/66
(52) U.S. Cl. ..................................... 370/352; 370/397
(58) Field of Search ................................. 370/352, 420, 370/463, 400, 401, 410, 522, 395, 397, 399, 395.2, 395.3, 395.31

(56) References Cited

U.S. PATENT DOCUMENTS

| | | | | |
|---|---|---|---|---|
| 4,905,231 A | * | 2/1990 | Leung et al. | 370/400 |
| 5,339,318 A | * | 8/1994 | Tanaka et al. | 370/399 |
| 5,764,639 A | | 6/1998 | Staples | 370/401 |
| 5,956,334 A | * | 9/1999 | Chu et al. | 370/352 |
| 5,982,767 A | * | 11/1999 | McIntosh | 370/352 |
| 5,987,025 A | * | 11/1999 | Hokari | 370/352 |
| 5,995,607 A | * | 11/1999 | Beyda et al. | 379/302 |

OTHER PUBLICATIONS

AT&T "*Using the OfficeLink I for Corporate Telecommunting*" Innovating Solutions for Telecommunications, Jul. 30, 1993, pp. 1–2.

Dec. 1993, "Marathon NetRunner Phase 3.0—56 Kbps ISU Module User's Manual," pp. 1–B2, Stock No. 800–1753–30, Rev. B.

Sep. 1993, "Marathon NetRunner Phase 3.0 Voice/Fax Module User's Manual," pp. 1–B29, Stock No. 800–1747–30, Rev. B.

Feb. 1993, "Marathon Phase 3.0 Command Facility Reference Guide," pp. 1–314, Stock No. 800–1706–30. Rev. A.

Jan. 10, 1995, "OfficeLink Brochure," pp. 1–2.

* cited by examiner

Primary Examiner—Chau Nguyen
Assistant Examiner—D. Trinh
(74) Attorney, Agent, or Firm—Neil G. J. Mothew

(57) ABSTRACT

A method and system is provided for associating private branch exchange (PBX) equipment with a remote access device over a packet network. The remote access device can be connected to a number of communication devices suitable for processing voice or data. The PBX equipment receives a request to initiate communication from the communication device over a signaling virtual channel provisioned from the packet network, provisions a communication virtual channel from the packet based network to carry communication information provided by the communication device, transmits control signals over the signaling virtual channel to control the timing and transfer of information associated with the communication device and the corresponding remote access device, exchanges communication information over the communication virtual channel, and transmits control signals over the signaling virtual channel that terminates the communication virtual channel and relinquishes resources provisioned from the packet network.

17 Claims, 4 Drawing Sheets

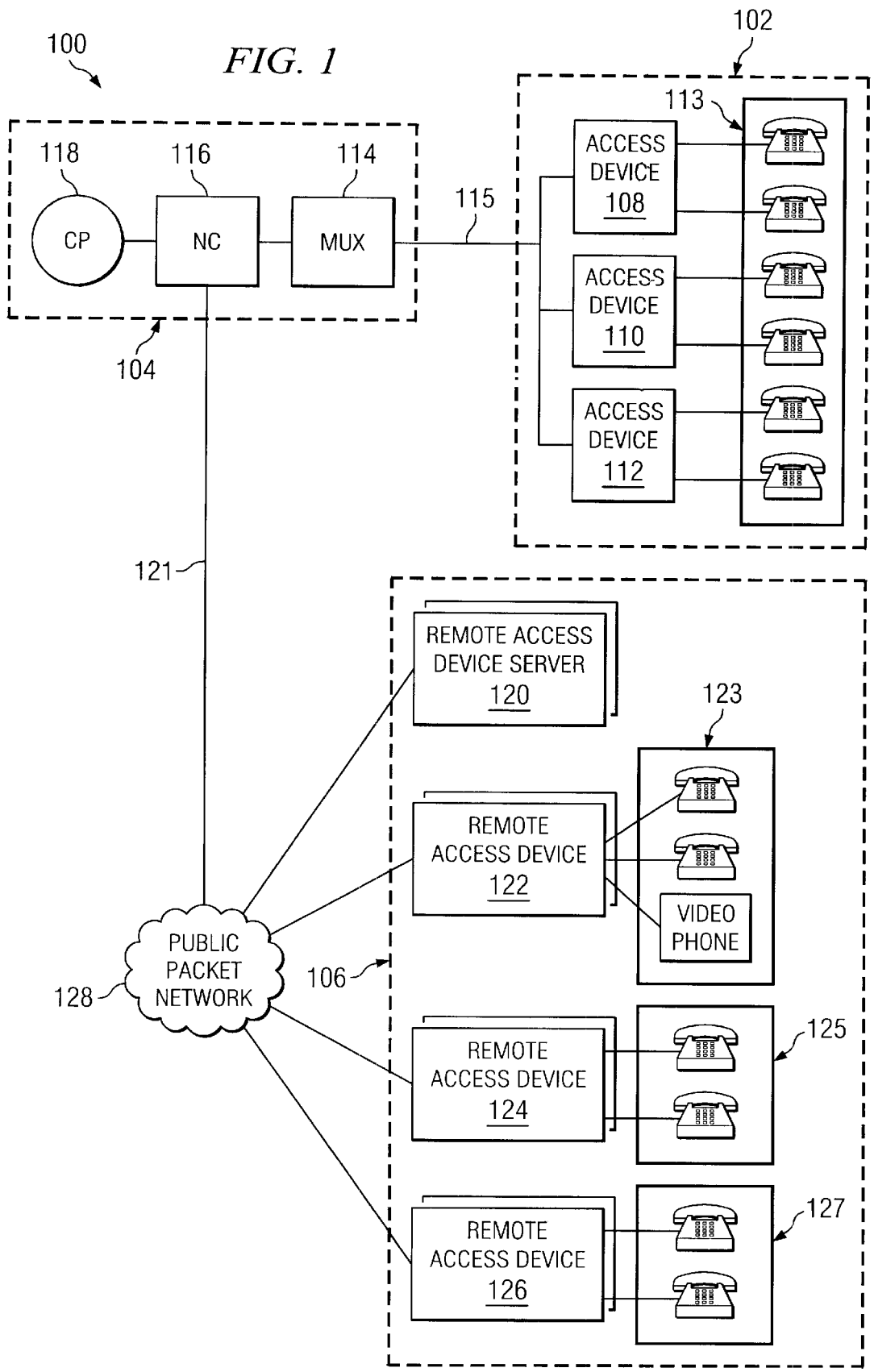

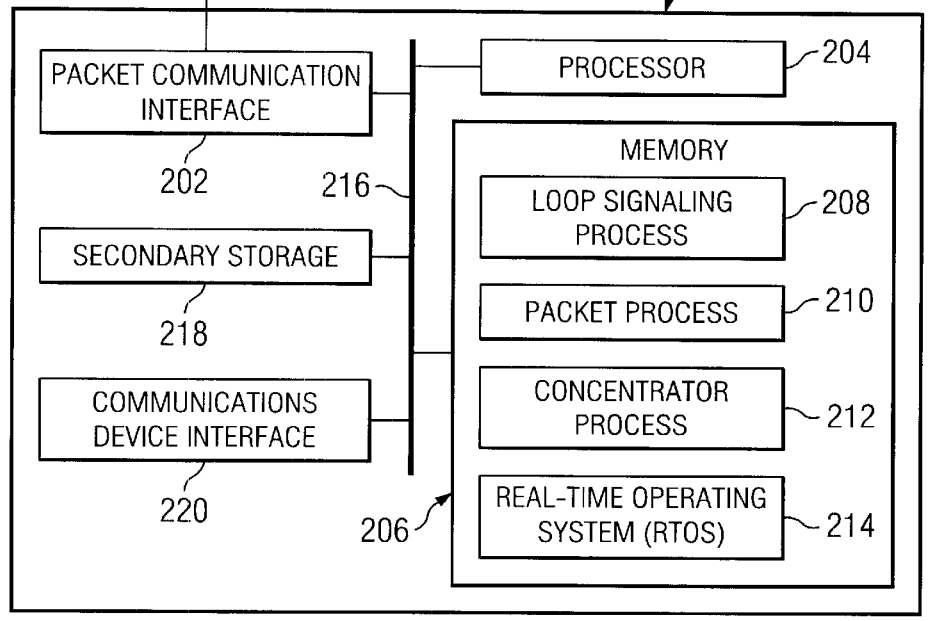
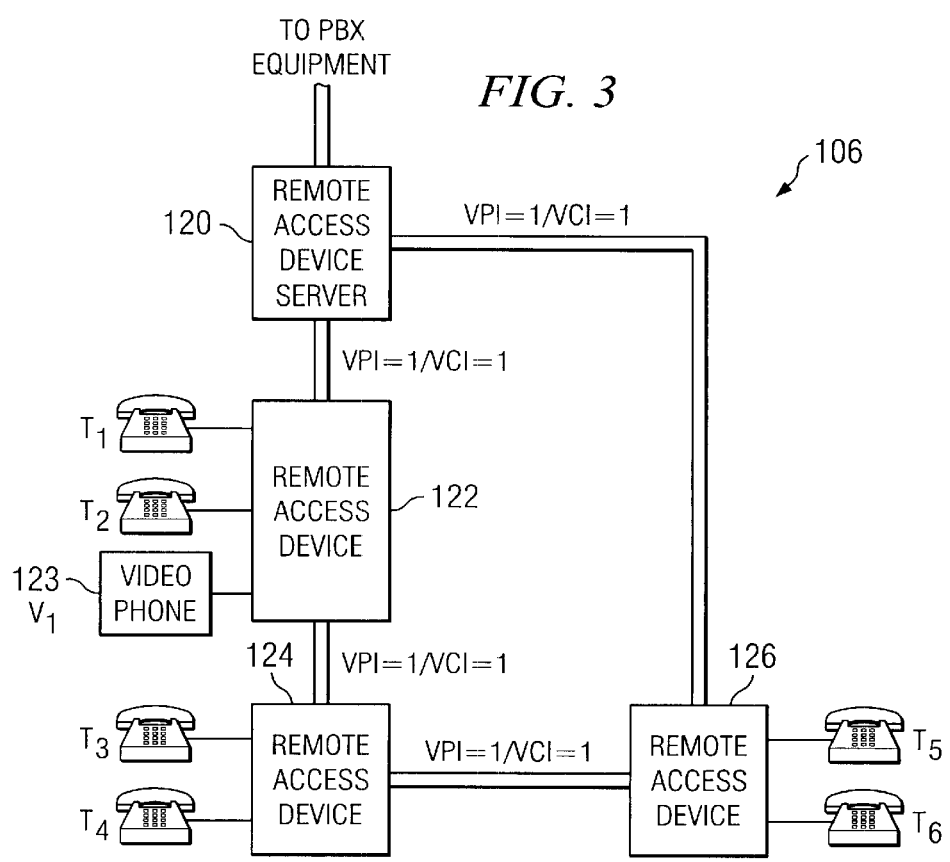

METHOD AND APPARATUS FOR DISTRIBUTING ACCESS DEVICES FOR VOICE/DATA COMMUNICATION IN A COMMUNICATION SYSTEM OVER PACKET BASED NETWORKS

BACKGROUND OF THE INVENTION

1. Field of the Invention

This invention generally relates to communications systems and more particularly, to a method and apparatus for distributing access devices for voice/data communication over a packet network.

2. Description of the Related Art

An increasing number of businesses have opened regional offices in rapidly growing parts of the world. Telephone services at each regional office are typically provided using a separate private branch exchange (PBX) system. The typical PBX system uses an array of specialized hardware arranged in a hierarchical configuration including a control processor (CP), a node controller (NC), and several access devices (ADs) coupled to a set of communication devices such as telephones or video conferencing devices. An AD converts pulse code modulated (PCM) voice signals from the communication devices into a time division multiplex (TDM) format. The NC packetizes this TDM data using a packet protocol such as asynchronous transfer mode (ATM) and sends it to the CP for call processing purposes. To carry the voice/data traffic between the various regional offices, private high speed lines such as T-1 or E-1 lines are coupled to the regional office PBX and the central office PBX.

Unfortunately, it may be hard to justify installing a complete PBX system at each regional office. For example, if a regional office grows slowly it may be many months or years before the capacity available on the PBX is utilized and the costs associated with installation of the PBX are recaptured. Alternatively, if a regional office grows too quickly a smaller PBX systems may not have sufficient capacity for the number of users in the office and the PBX system may need replacement before it's useful life.

To address these limitations, the capacity of a PBX system should be shared between several regional offices. Further, public networks should be utilized rather than private networks to reduce overall communication costs. Accordingly, it would be desirable to distribute the access devices and associated communication devices associated with a PBX system over public networks.

SUMMARY OF THE INVENTION

A method consistent with this invention for associating private branch exchange (PBX) equipment with a remote access device over a packet network, wherein the remote access device includes a corresponding communication device for processing voice or data, comprises discovering a remote access device operatively coupled to the packet network; associating the remote access device and the corresponding communication device into a logical group; provisioning a signaling virtual channel from the packet network to carry signaling and timing information to the logical group of remote access device and communication device; and associating the signaling virtual channel with the logical group to facilitate the transportation of signaling and timing information from the PBX equipment to the remote access device and accommodate communications with the corresponding communication device.

An apparatus consistent with this invent that associates private branch exchange (PBX) equipment with a remote access device over a packet network, the remote access device including a communication device for processing voice or data, and the apparatus comprises a discovery module capable of discovering a remote access device operatively coupled to the packet network; an association module capable of associating the remote access device and corresponding communication devices into a logical group; a provisioning module capable of provisioning a signaling virtual channel from the packet network to carry signaling and timing information to the logical group of remote access devices and communication devices; and an associating module capable of associating the signaling virtual channel with the logical group to facilitate the transportation of signaling and timing information from the PBX equipment to the remote access device and accommodate communications with the at least one communication device.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention.

In the drawings:

FIG. 1 is a block diagram illustrating a communication system distributed over a packet network consistent with the present invention;

FIG. 2 is a block diagram depicting the components of a remote access device as illustrated in FIG. 1;

FIG. 3 is a block diagram depicting the use of virtual channels in a packet network to establish communication between PBX equipment and a remote communication configuration;

DETAILED DESCRIPTION OF THE INVENTION

Introduction

Figure 4:
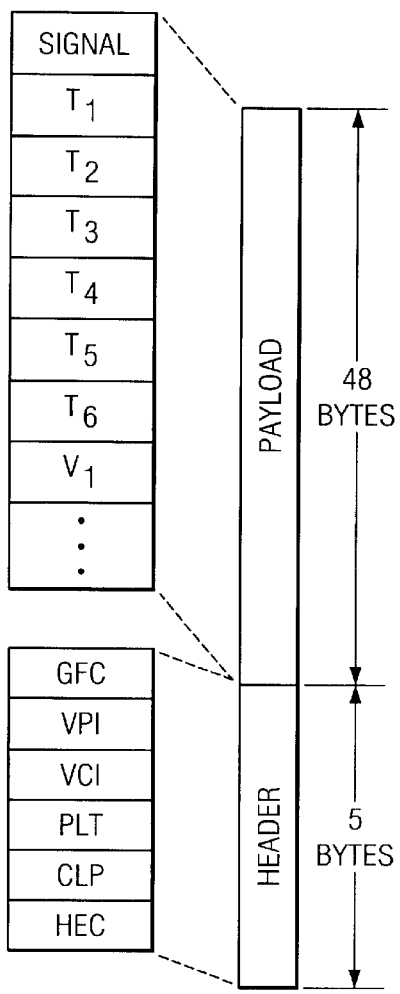
FIG. 4 is a block diagram illustrating a fixed length 53 byte ATM cell having a 48 byte payload portion and a 5 byte header portion provisioned consistent with the present invention.

Reference will now be made in detail to an implementation, consistent with the present invention, illustrated in the accompanying drawings. Wherever possible, the same reference numbers will be used throughout the drawings and the following description to refer to the same or like parts.

FIG. 1 is a block diagram illustrating a communication system 100 distributed over a packet network in accordance with the present invention. System 100 includes a local communication configuration 102, private branch exchange (PBX) switch equipment 104, and a remote communication configuration 106 coupled to PBX switch equipment 104 through a public packet network 128.

Local communication configuration 102 transmits voice/data information to PBX switch equipment 104 through a private packet network established over local high speed link 115. Bandwidth from local high speed link 115 is statically allocated when local communication configuration 102 is configured. For example, local high speed link 115 may transport the voice/data information between local access devices 102 and PBX switch equipment 104 over permanent virtual circuits (PVC) created using a packet protocol such as Asynchronous Transfer Mode (ATM). Packet resources such as bandwidth and configuration parameters are statically allocated to local high speed link 115 to carry signaling and communication information between PBX switch equipment 104 and local communication configuration 102. In particular, ATM configuration parameters such as a virtual path identifier (VPI) and virtual channel identifier (VCI) are set in advance according to proprietary configuration requirements for carrying information over local high speed link 115. Because these settings are proprietary and set statically, the ATM protocol used over local high speed link 115 is often incompatible with a public ATM network such as public packet network 128.

Systems and methods consistent with the present invention can facilitate the exchange of voice/data information from local communication configuration 102 to remote communication configuration 106 through remote high speed link 121 and public packet network 128. Remote communication configuration 106 may allocate resources such as bandwidth and set configuration parameters dynamically on public packet network 128 as calls are established and terminated.

In system 100, local communication configuration 102 include access device 108, access device 110, and access device 112 coupled to communication devices 113 as illustrated. Communication devices 113 may include phones, video devices, and other equipment capable of receiving audio or video information. Communication devices 113 transmit pulse code modulated (PCM) samples voice/data information to the corresponding access devices. These access devices may sample a partial T-1/DS-0 link transmitting PCM voice information at 64 Kbps from communication devices 113 using an 8 kHz sampling rate.

Access device 108, access device 110, and access device 112 convert PCM samples of voice/data from local communication devices 113 into a stream of data using time division multiplexing (TDM) techniques well known in the art. Timing information provided by PBX switch equipment 104 enables access devices in local communication configuration 102 to also convert TDM information back into separate PCM voice/data information for use by local communication devices 113.

PBX switch equipment 104 facilitates processing and switching of voice/data between local communication configuration 102 and remote communication configuration 106. PBX switch equipment 104 includes a multiplexor (MUX) 114, a node controller (NC), and a control processor (CP) coupled together in a hierarchical manner as shown in FIG. 1. Incoming calls containing TDM voice/data received from local communication configuration 102 are packetized by MUX 114 and sent to NC 116 for call processing purposes. Conversely, MUX 114 can convert packets into separate TDM streams and multiplex the data over local high speed link 115 to the respective access devices within local communication configuration 102.

For example, MUX 114 converts TDM voice/data samples received from access device 108, access device 110, and access device 112 in 640 different time slots and concentrates them into packets. These packets are filled with information from the 640 different time slots even if voice/data is not being transmitted and some of the time slots are empty. In one implementation, local high speed link 115 uses a proprietary asynchronous transfer mode (ATM) configuration to carry 50 Mbps over an STS-3 or OC-3 physical link. This proprietary ATM protocol transmits packets using a fixed virtual path identifier (VPI) and virtual channel identifier (VCI) because the connection is statically defined when the PBX system is configured. This makes it difficult to dynamically add components to the PBX without reconfiguring the system. For at least these reasons, PBX switch equipment 104 is generally not immediately compatible with a public ATM network such as public packet network 128.

NC 116 operates as a switching device and sends packets of data/voice information to CP 118 for processing features provided by a private branch exchange (PBX) system. If the packets from CP 118 are destined for local communication configuration 102, then NC 116 sends the packets to MUX 114 and then onto local communication configuration 102. If, however, the resulting packets are destined for remote communication configuration 106, they are sent from NC 116 over remote high speed link 121 for distribution over public packet network 128.

Additional processing and switching of voice/data information on remote communication configuration 106 is made possible in accordance with implementations of the present invention. Remote communication configuration 106 includes a remote access device (RAD) server 120, RAD 122, RAD 124, and RAD 126 coupled by public packet network 128. RAD server 120 determines the configuration of RAD 122, RAD 124, RAD 126 on the network in addition to configuration of remote communication devices such as remote communication devices 123, 125, and 127. Moreover, RAD server 120 facilitates communication between the remote communication devices 123, 125, and 127, local communication devices 113, and other communication devices operatively coupled to public packet network 128.

FIG. 2 is a block diagram depicting the components of RAD 122 in FIG. 1. Each RAD facilitates adding communication devices, such as telephones or video devices, directly to a public network, such as public packet network 128. RAD 122 includes a packet communication interface 202, a processor 204, a memory 206, a secondary storage 218, and a communication device interface 220. Packet communication interface 202 provides connectivity to public packet network 128. For example, packet communication interface 202 provides the physical connections for receiving timing, signaling, and communication information from a public ATM network.

Processor 204 executes processes stored in memory 206 and enables RAD 122 to exchange voice/data over public packet network 128. Depending on the implementation requirements, processor 204 can be an application specific integrated circuit (ASIC) or a general purpose central processing unit (CPU). Communication device interface 220 provides connectivity to devices such as telephones that encode voice using pulse code modulation (PCM) or other devices that provide digital video or other data. Secondary storage 218 can be a flash memory device, a disk drive, or other storage medium used to store configuration information or operate as a buffer for information queued for processing.

Memory 206 includes processes such as loop signaling process 208, a packet process 210, a concentrator process 212, and a real-time operating system (RTOS) 214. Loop signaling process 208 processes signaling information used to establish calls between local communication configuration 102 and remote communication configuration 106. For example, loop signaling process 208 initially sends signals to RAD server 120 to add RAD 122 as an available remote access device when RAD 122 is coupled to the packet network. Loop signaling broadcasts to RAD server 120 over public packet network 128 a unique address associated with RAD 122 and an inventory of the communication devices coupled to RAD 122. RAD server 120 records this information in internal tables and sends loop signaling process 208 a unique virtual path identifier (VPI) and virtual channel identifier (VCI) combination corresponding to a signaling virtual channel. Later, loop signaling process 208 uses the signaling virtual channel to obtains signaling and timing information transmitted by RAD server 120. Loop signaling process 208 passes signaling and timing information to other RADs coupled to public packet network 128 over the same signaling virtual channel thus creating a loop of signaling information.

Typically, communication devices provide PCM voice information to communication device interface 220. Concentrator process 212 then converts the PCM voice information received from the communication device interface 220 into TDM data. Alternatively, concentrator process 212 can also convert TDM data into PCM data and distribute the resulting information to the communication devices through communication device interface 220.

Packet process 210 converts between packets and TDM data. For example, in an ATM network packet process 210 extracts signaling, timing, and communication information from packets carried over the virtual channels provisioned from the packet network. Signaling information typically controls the setting up and breaking down calls while the communication information carry information generated by the communication devices attached to RAD 122. Timing information is embedded along with the signaling information transmitted to RAD 122. Packet process 210 may also be used to reverse this process and convert ATM packets back into TDM data.

Real-time operating system (RTOS) 214 is an operating system used to manage resources on RAD 122 and control the execution of software modules in memory 206. RTOS 214 is used to improve the response time to requests for setting up calls and processing calls through packet process 210, loop signaling process 208, and concentrator process 212. In an alternate implementation, non-real time operating systems such as UNIX can be used to execute software modules in memory 206 instead of RTOS 214 when a real-time response is not required.

FIG. 3 is a block diagram depicting the use of virtual channels in a packet network to establish communication between PBX equipment and a remote communication configuration. Remote communication configuration 106 includes RAD server 120, RAD 122, RAD 124, and RAD 126 coupled together using ATM communication channels as illustrated. Associated with each RAD are communication devices such as telephones, video phones, or other devices. Specifically, RAD 122 includes telephones $T_1$, $T_2$, and video phone $V_1$; RAD 124 includes telephones $T_3$ and $T_4$; and RAD 126 includes telephones $T_5$ and $T_6$.

Each RAD is capable of communicating with each other and RAD server 120 over an ATM network using cells identified with the unique virtual path identifier (VPI) and virtual connection identifier (VCI). In one implementation, RAD server 120 uses the same packet to transmit signaling and communication information to each RAD and corresponding communication devices. A portion of each packet is dedicated to carry signaling and timing information to each RAD information while other portions of the packet are carrying communication information. This technique of passing signaling information over a single packet is called "loop signaling" because the signaling information is sent to a group of RADs. The group of RADs sharing a VPI and VCI pair are put in logical groups called a "virtual shelf". As shown in FIG. 3, the VPI field and VCI field combination (VPI=1 and VCI=1) combination identifies the RADs grouped together in the logical group. Unlike conventional PBX access devices, the virtual shelf enables RADs to become part of the same logical group without being located in the same physical location or share a physical cabinet or shelf.

To distinguish calls made using the same VPI and VCI pair, server 120 maintains a table that maps portions of a packet transmitted with specific telephones or video phone communication devices. RAD server 120 replicates this table and pushes it out to RAD 122, RAD 124, and RAD 126 as necessary when the table is modified or updated. In addition, RAD server 120 may also push this table to PBX switch equipment 104 thus facilitating communication with local communication configuration 102 and other devices. For example, each time a new RAD is attached to the ATM network, RAD server 120 updates the table for each new communication device and redistributes the information.

FIG. 4 is a block diagram illustrating a fixed length 53 byte ATM cell having a 48 byte payload portion and a 5 byte header portion allocated in accordance with the present invention. The 48 byte payload portion dedicates a predetermined slot, for example slot 47, to carry signaling information. Other slots in the 48 byte payload section are dynamically allocated to carry communication information to the communication devices as required. For example, bytes 46–39 are allocated to telephone communication information while byte 38 is allocated to video phone information. In the header of the ATM cells are a generic flow control (GFC), a virtual path identifier (VPI) field, a virtual channel identifier (VCI) field, a payload information type (PT) field, a cell loss priority (CLP) field, and a header error control (HEC) field.

In an alternate implementation, RAD server 120 may use separate packets to establish a signaling virtual channel, a timing virtual channel, and a communication virtual channel. Instead of partitioning a single cell into multiple virtual channels, RAD server 120 provisions separate virtual channels using separate packets to carry the signaling, timing, and communication information. For example, a permanent virtual channel (PVC) with VPI=1 and VCI=1 can be used for signaling information and a PVC with VPI=1 and VCI=2 can be used to carry timing information. RAD server 120 transmits signaling and timing information to each RAD in the virtual shelf. As calls are initiated, RAD server 120 dynamically provisions a communication virtual channel and new VPI and VCI pair. To conserve network bandwidth, switched virtual circuits (SVCs) rather than PVCs are used to establish the communication virtual channel and carry the communication information between the communication devices coupled to the packet network. These SVCs are advantageous over PVCs because they can allocate and deallocate resources from the network as necessary. Details on transmitting voice over an ATM network is discussed in U.S. patent application Ser. No. 09/215,202, entitled "Method and Apparatus for Transmitting Signaling Information Between Communication Nodes Coupled To a Packet Based Network" by Jackie Lee, Yao-Fun Choy, and Greg Bernstein, filed Dec. 18, 1998, and is incorporated by reference herein.

Figure 5:
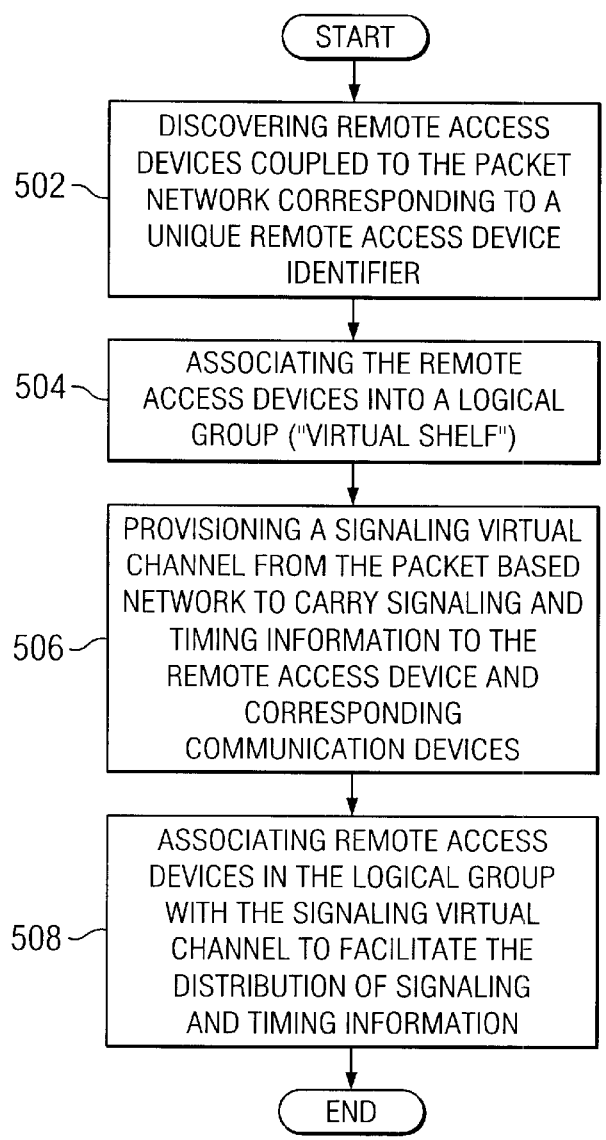
FIG. 5 is a flowchart diagram that indicates the steps associated with creating a virtual shelf of remote access devices consistent with the present invention.

Referring to FIG. 5, a flowchart diagram indicates the steps associated with creating a virtual shelf of remote access devices in accordance with the present invention. Initially, RAD server 120 discovers the remote access device (RAD) coupled to the packet network and stores away a unique identifier for each RAD (step 502). Each RAD transmits to RAD server 120 a unique identifier once the RAD is attached to the ATM network, powered on, and beings communicating over the network. The unique identifier allows PBX switch equipment 104 to address RADs coupled to the network. In addition to the unique identifier, each RAD also provides information on the communication devices coupled to the RAD. For example, a RAD may indicate that it is connected to 2 telephones and 1 video phone.

The discovery process used to acquire this information occurs each time a new RAD is added onto the ATM network. This discovery process can be adapted from Dynamic Host Configuration Protocol (DHCP) used on Internet Protocol (IP) networks to dynamically allocate Internet addresses. The DHCP protocol described in the Internet Executive Task Force (IETF) documents entitled "Dynamic Host Configuration Protocol" (RFC 1531), "DHCP Options and BOOTP Vendor Extensions" (RFC 1533), and "Interoperation Between DHCP and BOOTP" (RFC 1534) are incorporated by reference herein.

Using each RAD's unique identifier, RAD server 120 associates the RAD devices into a logical group (step 504). Essentially, RAD server 120 groups the RADs together in a "virtual shelf" by storing the unique RAD identifier in a table along with information on the corresponding communication devices attached to the RAD. Unlike the communication devices in local communication configuration 102, these communication devices coupled to the RADs can be located anywhere on a packet based network and do not require a direct physical connection to PBX switch equipment 104.

Next, RAD server 120 provisions a signaling virtual channel from the packet based network to carry signaling and timing information to each RAD (step 506). In accordance with one implementation of the invention, a portion of the payload section is allocated to a virtual channels for signaling and timing information while the remaining portion of the payload section is allocated to carry communication information to each RAD and associated communication devices. This first implementation uses a permanent virtual channel (PVC) so that signaling and timing information is continually delivered to the RADs and associated communication devices. Alternatively, RAD server 120 may provision a separate switched virtual channel (SVC) using separate packets to carry communication information to each RAD and the corresponding communication devices attached to the RAD. This alternate implementation allows the communication channels to be allocated and deallocated dynamically using a SVC while the signaling and timing channels are provided over PVC type virtual channels.

Once the path for carrying signaling is created, RAD server 120 associates each RAD in the logical group with the signaling virtual channel to facilitate the distribution of signaling and timing information (step 508). RAD server 120 pushes the table mapping each RAD with the signaling virtual channel to each RAD coupled to the ATM network. The table indicates which portion of the cell are reserved for signaling and timing information and which portions of the cell, if any, are available to carry communication information.

To synchronize each RAD, timing information set by RAD server 120 may be provided over the signaling virtual channel carried to each RAD. This enables the communication devices coupled to a RAD to communicate with communication devices on local communication configuration 102 even though the communication devices are not directly connected to the same clock. In an alternate implementation of the present invention, signaling and timing information can be carried over separate virtual channels using separate packets on the network.

Figure 6:
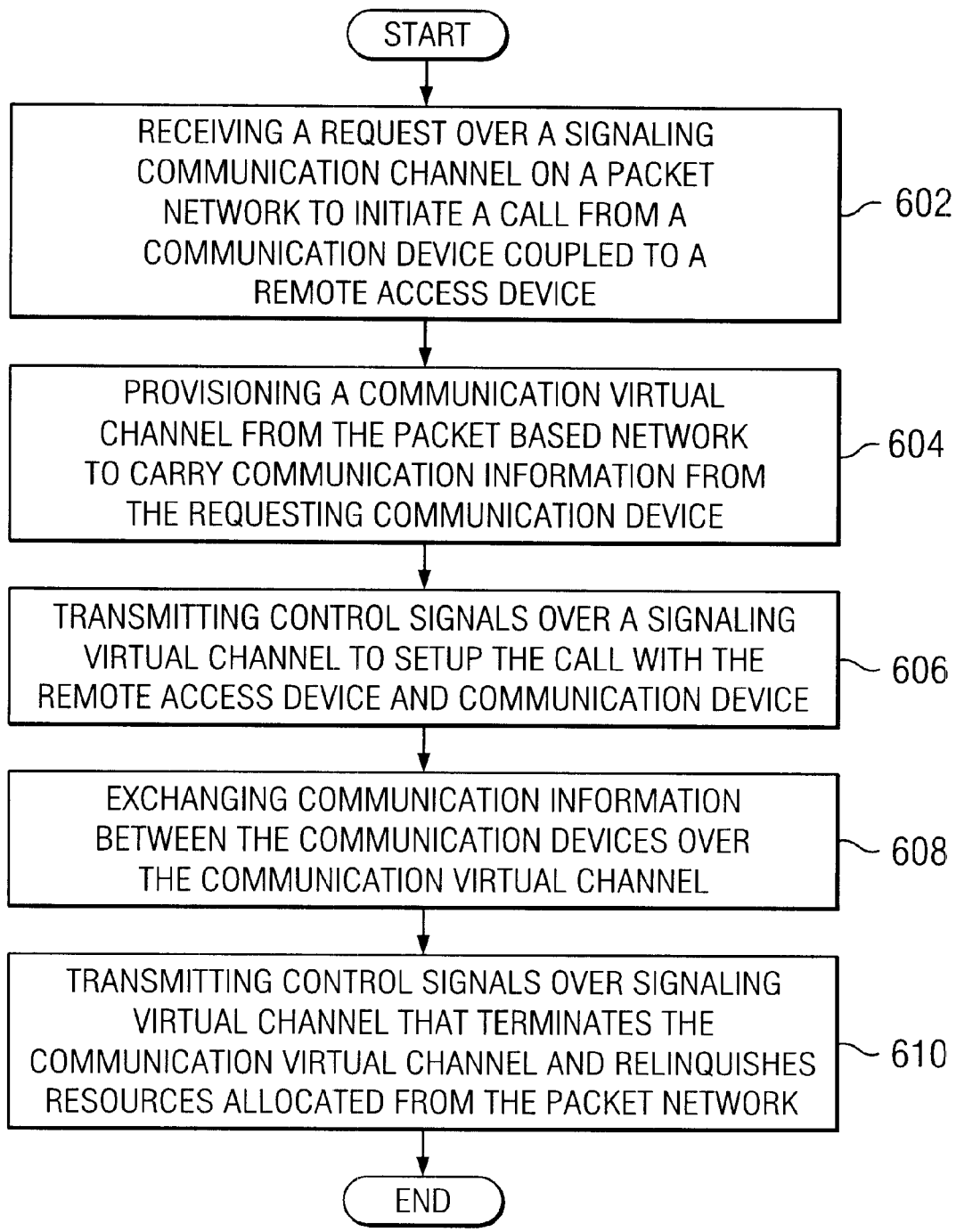
FIG. 6 is a flowchart diagram indicating the steps associated with setting up and breaking down a call on a communication device attached to a remote access device.

FIG. 6 is a flowchart diagram indicating the steps associated with setting up and breaking down a call on a communication device attached to a remote access device. Initially, RAD server 120 receives a request to initiate a call with a communication device coupled to a RAD (step 602). The request can be from a communication device associated with local communication configuration 102 or may be from a different communication device within remote communication configuration 106. If the communication device is associated with a RAD in remote communication configuration 106, RAD server 120 identifies the communication device and responds to the requesting communication device indicating the status of the requested communication device.

RAD server 120 provisions a communication virtual channel from the packet based network to carry communication information from the requesting communication device (step 604). In one implementation, a separate communication virtual channel is allocated from a separate packet. This packet does not carry signaling or timing information. For example, in an ATM network this communication virtual channel would have a unique VPI/VCI pair to distinguish the communication virtual channel from other signaling, timing, or communication virtual channels on the network. In an alternate implementation, if a single packet carries signaling, timing, and communication information then RAD server 120 reserves a portion of the packet to communication information as depicted, for example, in FIG. 4.

Next, RAD server 120 transmits control signals over a signaling virtual channel to the appropriate RAD and communication device to setup the call (step 606). In an ATM network, network identification information, such as a VPI/VCI pair, associated with the signaling virtual channel can be stored in a table on RAD server 120 and used to transmit the signaling information. A RAD receiving a call request may refer to the table on RAD server 120 or may refer to a local copy of the table stored directly on the RAD in secondary storage. Once the signaling virtual channel is established with the RAD and corresponding communication device, call setup is achieved using traditional techniques well known in the art.

The communication devices then exchange communication information over the communication virtual channel (step 608). As previously discussed, the communication virtual channel can be provisioned using separate packets in an ATM network or may be established by allocating portions of the payload section of a single ATM cell as illustrated in FIG. 4. Calls made within remote communication configuration 106 pass through remote high speed link 121 for processing by CP 118. Once such processing is complete, the call may continue on through NC 116 to communication devices within either local communication configuration 102 or remote communication configuration 106.

After completing the call, RAD server 120 transmits control signals over signaling virtual channel to terminate communication over the communication virtual channel (step 610). If a separate packet is used for the communication virtual channel, terminating the call then relinquishes bandwidth to public packet network 128. Alternatively, if the communication virtual channel occupies only a portion of a packet as shown in FIG. 4 then termination of the call makes that portion of the packet available for other communication devices within remote communication configuration 106.

While specific embodiments have been described herein for purposes of illustration, various modifications may be made without departing from the spirit and scope of the invention. For example, an alternative implementation of the present invention can be designed that transmits packet information over an Internet protocol (IP) network or TCP/IP network rather than an ATM protocol based network as discussed above. Accordingly, the invention is not limited to the above described embodiments, but instead is defined by the appended claims in light of their full scope of equivalents.

What is claimed is:

1. A method for associating private branch exchange (PBX) equipment with a remote access device over a packet network, wherein the remote access device includes a corresponding communication device for facilitating communication between the remote access device and the PBX equipment using a processor coupled to the PBX equipment through the packet network, the method comprising:

discovering a remote access device operatively coupled to the packet network;

associating the remote access device and the corresponding communication device into a logical group;

provisioning a signaling virtual channel from the packet network to carry signaling and timing information to the logical group; and associating the signaling virtual channel with the logical group to facilitate the transportation of signaling and timing information from the PBX equipment to the remote access device and accommodate communications with the corresponding communication device.

2. The method of claim 1 wherein discovering the remote access device further comprises:

receiving a unique identifier associated with the remote access device over the packet network when the remote access device is communicating over the packet network.

3. The method of claim 2 further comprising:

providing information describing the communication device corresponding to the remote access device coupled to the packet network.

4. The method of claim 2 further comprising:

allocating a network address to each remote access device dynamically that allows the PBX equipment to address the remote access device on the packet network.

5. The method of claim 1 wherein each remote access device includes a unique identifier, and associating the remote access device into a logical group further comprises, storing the unique identifier associated with the remote access device in a table that maps the at least one remote access device and corresponding communication devices to the logical group.

6. The method of claim 1 wherein the packet network comprises an asynchronous transfer mode (ATM) network, and wherein provisioning a signaling virtual channel from the packet network further comprises, allocating a virtual channel from the ATM network.

7. The method of claim 1 wherein the packet network comprises an Internet Protocol (IP) network, and wherein provisioning a signaling virtual channel from the packet network further comprises, allocating a socket from the Internet Protocol (IP) network.

8. The method of claim 1 wherein the packet network comprises an asynchronous transfer mode (ATM) network, and wherein associating the signaling virtual channel from the packet network further comprises, creating virtual path identifiers (VPIs) and virtual channel identifiers (VCIs) for each remote access device and associated communication devices in the logical group.

9. The method of claim 8 further comprising:

distributing the virtual path identifiers (VPIs) and virtual channel identifiers (VCIs) to each remote access device and associated communication devices in the logical group.

10. A method for associating private branch exchange (PBX) equipment with a remote access device over a packet network, wherein the remote access device includes a corresponding communication device, the method comprising:

discovering a remote access device operatively coupled to the packet network, wherein said discovering includes receiving a unique identifier associated with the remote access device over the packet network when the remote access device is communicating over the packet network;

allocating a network address to the remote access device using a Dynamic Host Configuration protocol (DHCP) that allows the PBX equipment to address the remote access device on the packet network;

associating the remote access device and the corresponding communication device into a logical group;

provisioning a signaling virtual channel from the packet network to carry signaling and timing information to the logical group of remote access device and communication device;

associating the signaling virtual channel with the logical group to facilitate the transportation of signaling and timing information from the PBX equipment to the remote access device and to accommodate communications with the corresponding communication device.

11. A method for associating private branch exchange (PBX) equipment with a remote access device over a packet network, wherein the remote access device includes a corresponding communication device, the method comprising:

discovering a remote access device operatively coupled to the packet network;

associating the remote access device and the corresponding communication device into a logical group;

provisioning a signaling virtual channel from the packet network to carry signaling and timing information to the logical group of remote access device and communication device, wherein said provisioning further comprises:

reserving a first portion of a packet on the packet network to carry signaling and timing information to the remote access device and corresponding communication device, and reserving a second portion of the packet to carry communication information to the remote access device and corresponding communication device; and associating the signaling virtual channel with the logical group to facilitate the transportation of signaling and timing information from the PBX equipment to the remote access device and accommodate communications with the corresponding communication device.

12. A method for private branch exchange (PBX) equipment to communicate over an asynchronous transfer mode (ATM) packet network with a remote access device having a communication device, the method comprising:

receiving a request to initiate communication from the communication device over a signaling virtual channel provisioned from the packet network;

provisioning a communication virtual channel from the packet based network to carry communication information provided by the communication device, wherein the provisioning the communication virtual channel further comprises,
allocating a portion of the packet carrying the signaling virtual channel to the communication virtual channel;

transmitting control signals over the signaling virtual channel to control the timing and transfer of information associated with the communication device and the corresponding remote access device;

exchanging communication information over the communication virtual channel, and transmitting control signals over the signaling virtual channel that terminates the communication virtual channel and relinquishes resources provisioned from the packet network.

13. A method for private branch exchange (PBX) equipment to communicate over an asynchronous transfer mode (ATM) packet network with a remote access device having a communication device, the method comprising;

receiving a request to initiate communication from the communication device over a signaling virtual channel provisioned from the packet network;

provisioning a communication virtual channel from the packet based network to carry communication information provided by the communication device, wherein the provisioning the communication virtual channel further comprises,
allocating the communication virtual channel separately from a packet not used to carry the signaling virtual channel;

transmitting control signals over the signaling virtual channel to control the timing and transfer of information associated with the communication device and the corresponding remote access device;

exchanging communication information over the communication virtual channel; and transmitting control signals over the signaling virtual channel that terminates the communication virtual channel and relinquishes resources provisioned from the packet network.

14. An apparatus that associates private branch exchange (PBX) equipment with a remote access device over a packet network, the remote access device including a communication device, the apparatus comprising:

a processor, coupled to the PBX equipment through the packet network, that facilitates communication between the remote access device and the PBX equipment;

a discovery module operable for discovering the remote access device operatively coupled to the packet network;

an association module operable for associating the remote access device and corresponding communication device devices into a logical group;

a provisioning module operable for provisioning a signaling virtual channel from the packet network to carry signaling and timing information to the logical group of remote access devices and communication devices; and an associated module operable for associating the signaling virtual channel with the logical group to facilitate the transportation of signaling and timing information from the PBX equipment to the remote access device and accommodate communications with the at least one communication device.

15. An apparatus that associates private branch exchange (PBX) equipment with a remote access device over a packet network wherein the remote access device includes at least one communication device, the apparatus comprising:

means for facilitating communication between the remote access device and the PBX equipment using a processor coupled to the PBX equipment through the packet network;

means for discovering the remote access device operatively coupled to the packet network;

means for associating the remote access device and corresponding communication devices into a logical group;

means for provisioning a signaling virtual channel from the packet network to carry signaling and timing information to the logical group of remote access devices and communication devices; and means for associating the signaling virtual channel with the logical group to facilitate the transportation of signaling and timing information from the PBX equipment to the at least one remote access device and accommodate communications with the at least one communication device.

16. A communication system, comprising:

private branch exchange (PBX) equipment coupled to a packet network;

a remote access device coupled to the packet network;

a communication device coupled to the remote access device;

a remote access device server, coupled to the PBX equipment through the packet network, having a table that associates the remote access device and the communication device into a logical group; and a signaling virtual channel provisioned from the packet network to exchange signaling and timing information between the logical group and the PBX equipment.

17. A communication system comprising:

a private branch exchange (PBX) equipment coupled to a packet network;

a remote access device coupling a communication device to the packet network;

a processor, coupled to the PBX equipment through the packet network and also coupled to the remote access device through the packet network, that facilitates communication between the remote access device and the PBX equipment;

a signaling virtual channel, provisioned from the packet network, initiating and terminating communication between the PBX equipment and the communication device coupled to the remote access device; and a communication virtual channel, provisioned from the packet based network, exchanging communication information between the PBX equipment and the communication device coupled to the remote access device.

* * * * *